INVENTOR.
GERALD BUCHMAN

BY

Leonard W. Suroff
ATTORNEY

March 25, 1969 G. BUCHMAN 3,434,312

LOCKING DEVICE FOR PORTABLE EQUIPMENT

Filed April 24, 1967 Sheet 2 of 3

*INVENTOR.*
GERALD BUCHMAN

*BY*

Leonard W. Suroff
ATTORNEY

INVENTOR.
GERALD BUCHMAN

BY

Leonard W. Suroff
ATTORNEY

United States Patent Office 3,434,312

Patented Mar. 25, 1969

3,434,312

LOCKING DEVICE FOR PORTABLE EQUIPMENT

Gerald Buchman, 2821 W. 12th St., Brooklyn, N.Y. 11224

Filed Apr. 24, 1967, Ser. No. 633,028

Int. Cl. E05b *73/00, 65/44;* F16b *41/00*

U.S. Cl. 70—58 14 Claims

ABSTRACT OF THE DISCLOSURE

To prevent the theft of portable equipment such as typewriters and cameras by a locking device that is easily attachable to portable equipment and in particular the desk or other surface on which the equipment normally rests. The locking device is operated by a key that is required for the removal of the portable equipment. A display cabinet on which cameras are positioned and locked in place in a manner in which they cannot be removed by rotating them, but at the same time are open to inspection, is also provided for.

*Background of the invention*

This invention relates to a locking device for preventing attempts at the unauthorized removal of normally portable equipment from a desired location. More in particular this invention relates to devices which are readily attachable to the existing portable equipment such as office equipment in the form of typewriters, adding machines, reproduction machines and any other portable equipment found in the office. The locking device claimed in this invention may be also used to secure cameras, projectors, etc., on display in stores to permit potential customers to view them without being able to remove them.

The theft of portable equipment from offices, such as typewriters, has increased in recent years as has other crimes. One reason contributing to the theft in many office buildings is the conversion to automatic self operating elevators as compared to those in which an elevator operator was employed who knew or had knowledge of the individuals visiting respective floors of a building. With automatic elevators the public has free ingress and egress to many more offices than before. In addition, many thefts are the result of company personnel as well.

*Objectives of the invention*

A particular object of the invention is to provide, in a manner hereinafter set forth, a new and novel means whereby it will not be possible for any person to easily remove portable equipment from a given location.

Another object of the present invention, is to provide in a manner as hereinafter set forth, a new and novel means for preventing the unauthorized removal of portable equipment from a given location unless a key is employed to operate a locking device associated therewith.

Another object of the present invention, is to provide a locking device capable of being suitably secured to a standard desk containing room for a typewriter with a minimal alteration to the desk and which locking device once secured can only be removed by an authorized individual having a key to unlock the lock associated with the locking device.

Another object of the present invention, is to provide in a manner as hereinafter set forth, a locking device for preventing the theft of portable office equipment which is readily applicable to office furniture such as desks, in a manner that the locking device would not be visible to even one using the portable equipment.

Another object of the invention is the provision of a locking device of the character that can be secured to various types and sizes of portable equipment and office furniture to prevent the unauthorized removal of the equipment.

Another object of the present invention, is to provide in a manner as hereinafter set forth, a display cabinet on which a number of cameras may be locked in place in a simple but efficient manner.

*Summary of the invention*

The foregoing and other objects are obtained by providing, in accordance with one embodiment of the invention illustrated in FIGURES 1–3, housing means having a pair of spaced apart openings in the base thereof, adapted to be respectively secured by first fastener means, extending through one of said openings, to the support means of the portable equipment and by second fastener means, extending through the other opening, to the portable equipment and extending through the support means. Guard means adapted to prevent access to and ease in releasing said fastener means is provided in the form of a yoke which is formed in a U-shape to prove two spaced apart parallel arms and a cross connection therebetween. The yoke extends transversely in a horizontal plane through opposite pairs of slots or apertures in spaced apart legs of said housing. The arms of said yoke intersect the vertical axes of said fastener means, or sufficiently overlap them to prevent access to the heads of the fastener means without removing the U-shaped yoke from its position.

Locking means is provided to engage the arms of the yoke in its extended position through the housing and thereby retain the guard means in a substantially fixed position to prevent its removal without a key. In operation, if a proper party wishes to remove the locked-in-place equipment he unlocks the locking means, disengaging it from the guard means and said guard means is withdrawn from its position in the openings in said housing with the result that the fastening means are now free to be disengaged. One particular aspect of this invention is that the first fastening means does not require removal to replace a typewriter and therefore once the housing means is secured in place it does not have to be removed to change a typewriter.

Vibration damping means may also be provided so that any vibrations setup in the portable equipment and support means is not transmitted to the housing, guard and locking means respectively.

In accordance with another embodiment of the present invention, illustrated in FIGURES 4 and 5, the locking means is secured to the housing means with a portion of said locking means extending within the housing chamber and adapted to engage the guard means which is contained within the housing chamber and having a latch portion for engagement with the locking means. The heads of the fastener means are fully enclosed by said housing to prevent access thereto. When unlocked to a free position the guard means is substantially removed from the housing to permit access to the fastener means for removal of the portable equipment. This embodiment of the inventions lends itself to be either applied to existing office furniture or built into the desk when initially manufactured.

In accordance with another embodiment of the invention, illustrated in FIGURES 6 and 7, the locking device is designed to be used generally with support means of sheet metal construction, and the locking device installed when the desk is manufactured to permit a construction of a compact nature in which the locking device is essentially hidden to any one seeing or using the desk.

In accordance with another embodiment of the present invention, illustrated in accordance with FIGURES 8 and 9, the housing means, which encloses a portion of the fastener means, has the guard means pivotally mounted to the housing means at one end thereof and the locking means at the opposite end thereof.

In accordance with another embodiment of the present invention, illustrated in accordance with FIGURES 10–13, a cabinet is provided for simultaneously displaying a number of portable pieces of equipment, such as cameras, such that they may be viewed but locked in place.

*Brief description of the drawings*

The invention possesses other objects and features of advantage, some of which, with the foregoing, will be set forth in the following description of the preferred embodiments of the invention. It is to be understood, however, that variations in the showing made by the said drawings and description may be adopted within the scope of the invention as set forth in the claims and which is illustrated in the drawings accompanying and forming part of the specification, in which:

*Discussion of the drawings*

Similar reference characters refer to similar elements throughout the several views of the drawings.

FIGURES 1 through 3 illustrate a typical piece of portable office equipment 10, which may be in the form of a typewriter or any other found generally in an office. The type or style of typewriter here illustrated is that wherein a plurality of feet 11 extend from the bottom 12 thereof, and which rest on support means 20 which may be an extension of a desk 21 or any other flat surface such as the top of a table, generally found in an office. The typewriter generally has a peripheral skirt 13 which leaves a minimal spacing between the upper surface 22 of the support means 20 and said skirt. The typewriter also has fastener securing means 15 in the base thereof, such as in the form of a threaded hole, and adapted to receive fastener means which are generally used to secure the typewriter in fixed position either during shipment or to prevent movement due to vibration when the unit is installed. All of the above described typewriter and associated support means is conventional and has been included merely to provide a background for explaining the construction and operation of this invention.

Figure 1:
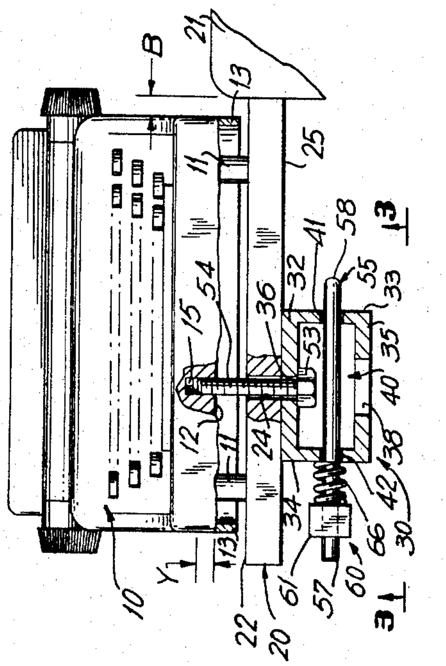
FIGURE 1 is a front elevational view, partly in section, of a locking device in accordance with the invention.
Figure 3:
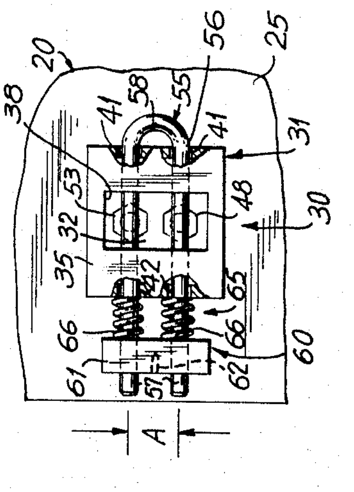
FIGURE 3 is a partial view taken along line 3—3 of FIGURE 2.
Figure 2:
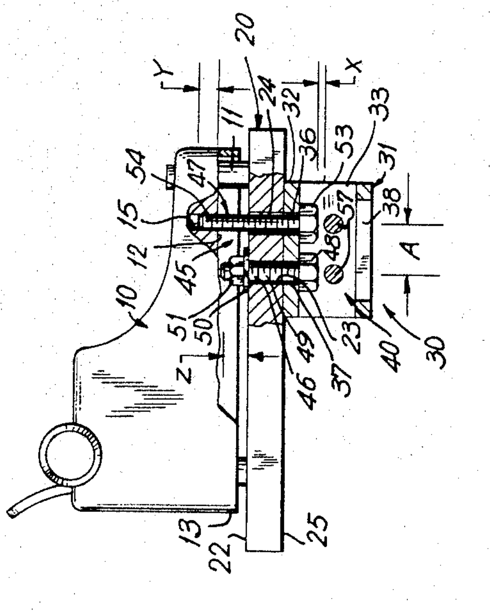
FIGURE 2 is a side elevational view, partly in section, of the locking device showing the relationship between the various component parts thereof.

Referring first to FIGURES 1, 2 and 3, illustrating one embodiment of the present invention, it is seen that the locking device 30, shown in assembled relation to the typewriter unit 10 and the support means 20, is comprised of housing means 31, mounted against the lower surface 25 of the support means, which may be formed of a suitable metal or plastic material, having a base 32 and a pair of integrally formed spaced apart legs 33 and 34, extending at substantially right angles to said base, with a cover plate 35 extending parallel to said base and preferably integrally formed with said spaced apart legs 33 and 34. The base further includes a pair of spaced apart openings 36 and 37 extending therethrough.

The cover plate 35 is provided with a centrally located slot 38 which permits access to the chamber 40 of the housing means 31 and the fastener means 45, consisting of first fastening means 46, and second fastener means 47 both partially contained therein and extending through the openings in the base.

The first fastener means 46 secures the housing 31 to the support 20 and may consist of a threaded bolt with its head 48 extending in the chamber 40, and its shank 49 extending through the clearance opening 37 in the base 32 and through an aperture 23 drilled in the support 20, with a lock washer 50 provided beneath the nut 51 and which when tightened will firmly retain the housing means 31 in fixed position.

The second fastener means 47 secures the typewriter 10 to the housing means 31 and may consist of a threaded bolt with its head 53 within the chamber 40 and its shank 54 extending through support opening 36 in the base and through an aperture 24 drilled in the support 20 and then into the fastener securing means 15 which is illustrated as a threaded coupling engaging the threaded shank 54.

The clearance apertures in the support means 20 may be obtained during installation of the locking device 30 by drilling through the support means to provide openings in alignment with those in the base 32.

A portion of the fastener means is contained within the housing chamber 40 and guard means 55 is provided for a horizontal movement from a first position as seen in FIGURE 3 to prevent access to bolt heads 48 and 53 to a second position in which access is available to said fastener means. The guard means 55 in the form of a yoke 56 is shown as comprising a single piece of metal, or other suitable material, which is formed in a U-shape to provide two spaced parallel arms 57 and a cross connection 58 therebetween. The spacing between the arms is substantially equal with the spacings between the pairs of openings 41 and 42 in legs 33 and 34 respectively, which are in transversely aligned relationship with respect to each other, such as to snugly receive the arms 57, which are inserted therethrough to extend across the width of the housing 31, as shown, with the free end of the arms extending beyond the leg 34.

The yoke arms 57 are of a length materially greater than the distance between the legs 33 and 34 so as to extend beyond the leg 33 for receiving the locking means 60. Additionally, the arms 57 of the yoke 56 substantially intersect the vertical axis of the fastener means 45, as seen best in FIGURE 3, or sufficiently overlap them to prevent their removal without having to first remove the guard means 55 from its position. As seen in FIGURE 2 the spacing between the yoke arms 57 is equal to a distance A which is substantially equal to the dimension between the respective locking bolts.

After the guard means 55 has been placed in position, as illustrated in FIGURES 2 and 3, by extending the arms 57 through the pairs of openings 41 and 42 in the legs 33 and 34, respectively, the locking means 60 is secured to the free end of the guard means and locked in place by means of lock 61. The lock 61 is employed to prevent the unauthorized removal of the guard means and in turn that of the typewriter.

The lock 61 here shown is one of any number of types which may be employed, and accordingly it is to be understood that in showing and describing this particular type or style, there is no intention to limit the invention in any respect as it will be readily obvious that the only requirement is of a lock having an element of suitable form to pass through both the arms 57 of the yoke 56.

The lock 61 here shown has openings or passages (not shown) to receive the arms 57 of the yoke 56 and a key slot 62 (FIGURE 3) into which a key is inserted to remove the lock. This lock is of a common well known type, being used principally as a bicycle lock, and accordingly it is not believed that a more detailed description is required for an understanding of its use as a part of this invention.

Another type of locking means and guard means, which may be employed in accordance with the invention, is the common padlock where one arm or shank thereof may extend through apertures in both legs so that the guard means may have only a single arm extending through the housing and overlapping the fastener means to prevent its removal without removing the guard means in the manner explained above.

To be assured that the locking bolts are not removed it is important that the distance X between the heads 48 and 53 of the fastener means 46 and 47 respectively, and the arms 57 be less than the distance Y which is the depth the shank 54 of the second fastener means 47 extends within the typewriter 10 and respectively the distance X be less than the distance Z, which is the distance the shank 49 extends beyond the upper surface 22 of the support means 20.

Although one housing is illustrated it is appreciated that a pair of locking devices may be used to present the typewriter itself from being rotated and removed even though the locking device is in place. This is generally not necessary if there is a difference in height between the upper surface 22 of the support means and the top of the desk, or the typewriter has a skirt 13. As seen in FIGURE 1, if the distance B is less than the distance between the threaded shank 54 in the base of the typewriter and the greatest distance to the edge of the typewriter than the typewriter cannot be rotated and removed.

With the locking device 30 applied to the support means 20 and portable equipment 10 in the manner thus far described it will be seen that the arms 57 prevent access to the fastener means 45 and the locking means 60 prevents the removal of the guard means 55 from the housing means 31. As further seen the only alteration necessary to the support means is the drilling of the clearance apertures 23 and 24, to accommodate the fastener means 46 and 47 respectively. These minor alterations are covered by the typewriter and are therefore hidden.

The locking device 30 is generally set back from the edge of the support means and is hardly if at all visible. Thus, this embodiment of the present invention discloses an easily attachable device to existing equipment is a simple efficient manner and which device generally made of metal acts to prevent the theft of various office equipment.

As an additional feature, vibration damping means 65 may be provided so that any vibrations setup in the portable equipment and transmitted through the support means 20 does not cause any excessive noise between the locking means 60 and the guard means 55. A coil spring 66 may be placed on each arm 57 between the leg 34 and the lock 61 and which springs apply a constant force of predetermined magnitude to maintain the guard means, housing means and locking means relatively fixed with respect to each other.

Figure 4:
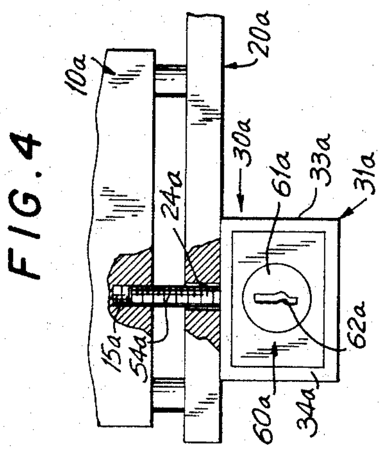
FIGURE 4 is a view similar to FIGURE 1 illustrating another embodiment of the invention in which the locking means is secured to the housing means.
Figure 5:
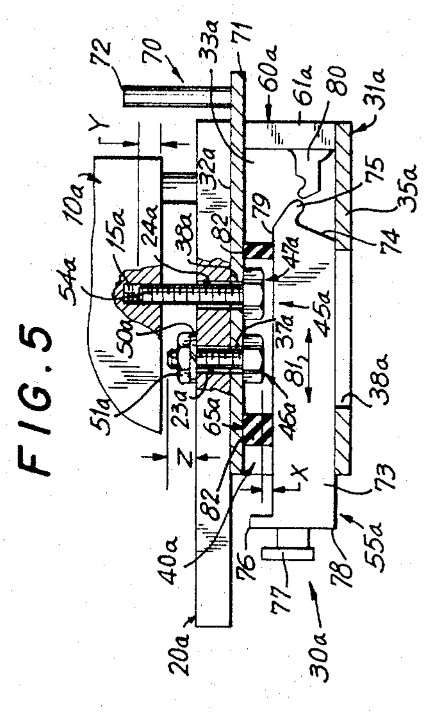
FIGURE 5 is a side view of the locking device of FIGURE 4.

In accordance with another embodiment of the present invention allustrated in FIGURES 4 and 5, it will be seen that the locking device 30*a* there illustrated is generally similar to the previously described locking device and differs substantially from the latter primarily with respect to the means provided for securing the guard means 55*a* to the locking means 60*a*. In this embodiment the guard means is reciprocally mounted and locking means are substantially contained within the housing means 31*a* when the locking device 30*a* is in its locked position. This embodiment of the invention also embodies four essential parts, comprising a housing means 31*a*, fastener means 45*a*, guard means 55*a*, and locking means 60*a*, though a fifth part in the form of vibration damping means 65*a*, may also be used in association with the essential four elements.

A housing 31*a*, is here shown as comprising a single piece of metal, plastic or other suitable material, which is formed having a base 32*a*, a pair of spaced apart legs 33*a* and 34*a*, respectively, and a cover plate 35*a* in spaced parallel relationship to the base 32*a* of the housing 31*a*, whereby a chamber 40*a* is formed to accommodate the guard means 55*a* and locking means 60*a* therein. Fastener means 45*a* consisting of first fastener means 46*a* in the form of a threaded bolt extends through the opening 37*a* in the base and clearance aperture 23*a* in the support means 20*a* and secures the housing means 31*a* with the use of washer 50*a* and nut 51*a* to said support means. Second fastener means 47*a* comprising a threaded bolt extending through the opening 38*a* and the clearance aperture 24*a* in the support means and engages the fastener securing means 15*a* in the typewriter 10*a* so that it is locked in place.

As previously explained the skirt of the typewriter is generally of sufficient height to engage the first fastener means if an attempt is made to remove the typewriter by rotating it counter-clockwise to release it from the second fastener means. In other instances, the support means is below an abutting area of the desk (as illustrated in FIGURE 1) which also prevents its rotation. For those installations where neither of the above two conditions exist stop means 70 may be provided to prevent the rotation and in turn removal of the typewriter. This is accomplished by providing a portion of the housing, for example the base, with an extended tab 71 which is beyond the edge of the support means. As seen in FIGURE 5 a vertically extending pin 72 supported by said tab 71 is provided which has a length above the base of the typewriter so as to prevent the rotation of the typewriter without engaging said pin.

A slot 38*a* is provided in the cover 35*a* of the housing which is of sufficient width and length to permit the use of a screw driver or wrench for the proper installation of the fastener means hereinabove described.

Guard means 55*a* adapted to be substantially contained within the housing chamber 40*a*, is comprised of a body portion 73 having a forwardly tapered front portion 74 terminating in a hooked portion 75. At the opposite end of said body portion is a vertically extending rib 76 which is generally designed to be seated within the housing chamber 40*a* when the guard means 55*a* is in its first or locked position. A handle 77 is provided on the rear face 78 of the slide means to permit its easy withdrawal from within the housing when the locking means 60*a* is unlocked to the second position. An advantage for providing the hooked portion facing the cover 35*a* of the housing is that the top 79 of the body portion 73 remains flat and if either of the first or second fastener means should work its way loose there is no possibility of it jamming the reciprocally mounted guard.

Locking means 60*a* in the form of a lock 61*a* of any conventional type may be secured within the forward end of the housing 31*a* with a key slot 62*a* (FIGURE 4) to receive a key that when rotated would vertically pivot the latch arm 80, as seen in FIGURE 5, which engages the hooked portion 75 of the guard body portion 73 when the body is in its first or forward position, and interlock in a conventional manner to prevent the removal of the guard means 55*a* from within the housing unless a key is used.

Thus, from the description given and with reference to the drawings, it can be seen that the guard means 55*a*, once the housing has been placed in a locked position need merely be reciprocated in the direction of double headed arrow 81 after being unlocked to gain access to the fastener means through the slot 38*a*. As seen with respect of FIGURE 5 unless one has a key to unlock the locking means 60*a* it is impossible to gain entrance to the first fastener means 46*a* and second fastener means 47*a*.

When a typewriter is generally used, or other portable equipment, the force applied by the operator or the inherent vibrations, if the equipment is electricly powered, may cause vibrations that would be transmitted to the guard means 55*a* which might prove to be objectionable. Thus, although the rib 76 may be in close engagement with the housing chamber wall and although the related locking portions may tightly grip each other it has been found advisable for certain designs to employ vibration damping means 65*a*. As seen in FIGURE 5 pads 82, made of a vibration absorbent material such as rubber or plastic are secured to the base 32*a* in any conventional manner not shown, to engage the upper surface 79 of the guard means to damp out any vibrations due to the looseness between the mating surfaces.

Similarly, as discussed with respect to FIGURES 1 through 3 the dimension X is less than the dimension Y and dimension Z. This is important in that even if the bolts of the fastener means 45*a* should work their way slightly loose due to vibrations they will still be able to prevent the unauthorized removal of the typewriter.

Figure 6:
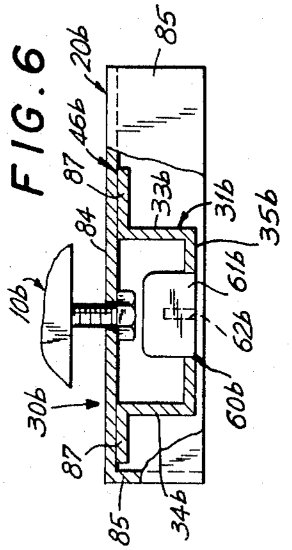
FIGURE 6 is a view similar to FIGURE 1 illustrating another embodiment of the invention which is primarily designed to be contained within the support means.
Figure 7:
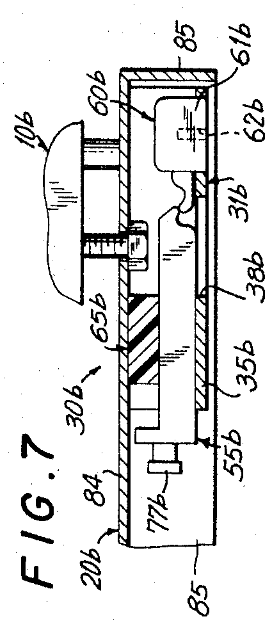
FIGURE 7 is a side view of the locking device of FIGURE 6.

Referring now to FIGURES 6 and 7, there has been shown another embodiment of the present invention in which the locking device 30*b* may be constructed for use with desks in which the entire locking device may be built in and essentially hidden from view. The support means 20*b* of many desks or tables are of a sheet metal construction having an enclosed wall therearound. As seen in FIGURES 6 and 7 the support means 20*b* has a top or horizontal surface 84 with a vertical wall 85 extending around it. The height of the wall may be about one or two inches which is more than sufficient to permit the locking device 30*b* to be fully contained therein.

The housing means 31*b* may be of a sheet metal construction, and as seen in FIGURE 6 is comprised of a housing similar to that shown in FIGURES 4 and 5 except that ears 87, extending from the vertical legs 33*b* and 34*b*, are provided to permit the first fastener means 46*b* to secure the housing to the support means 20*b* as by welding the ears 87 to the surface of the support means.

The guard means 55*b* may be similar to that illustrated above for reciprocation in a horizontal plane with a handle 77*b* at one end thereof to facilitate the ease of movement from a first to second position. The locking means 60*b* consisting of lock 61*b* is secured to the cover 35*b* of the housing in any conventional manner, and is of the commercial type such that the key must be inserted from beneath the support means 20*b* in a vertical direction since the wall 85 acts as an enclosure. In this manner the key slot 62*b* is not at all visible to someone sitting at the desk or anyone else in the office.

Vibration damping means 65*b* may also similarly be employed and secured to the housing side walls to take up for the possible loose spacing between the housing 31*b* and the guard means 55*b*.

In this embodiment of the invention the first fastener means 46*b* is attained by securing the housing, as by welding, to the support means 20*b*, and the second fastener means 47*b* may be attained by using a bolt extending through the support top 84 which acts as part of the housing, and within the typewriter 10*b*.

Although it has been illustrated in these embodiments that one locking device is used to secure a piece of portable equipment in place it should be understood that two locking devices may be used for double security. This especially so in those instances where there is no skirt on the equipment or an abutting edge on the desk and it is not desirable to use the stop means as illustrated in FIGURE 5.

Figure 9:
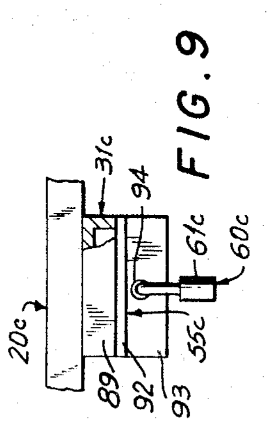
FIGURES 8 and 9, illustrate another embodiment of the invention.
Figure 8:
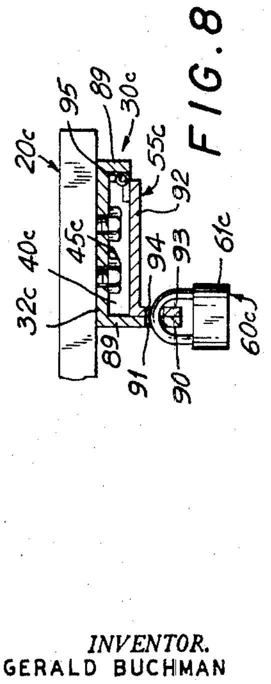

Referring now to FIGURES 8 and 9, there has been shown another embodiment of the present invention in which the locking device 30*c* may be used in a manner hereinabove explained and which comprises a housing means 31*c*, a guard means 55*c* pivotally connected to said housing means at one end thereof, with the locking means 60*c* securing them together.

The fastener means 45*c* extends through the base 32*c* of the housing means 31*c* to secure the latter to the support means 20*c*. The housing chamber 40*c* is formed by the base 32*c* and vertically extending walls 89 integrally formed with said base and having an ear 90 extending from one of said walls with an aperture 91 extending therethrough (FIGURE 8).

The guard means 55*c* is in the form of a cover 92 having a shoulder 93 with a clearance aperture 94 therein and which is in alignment with aperture 91 when the cover 92 is in the position as seen in FIGURE 8. A hinge 95 connects the wall 89 to the cover 92 so as to permit pivotal movement from the first position of the guard means 55*c* as shown in FIGURE 8 to a second position after the locking means 60*c* in the form of a lock 61*c* has its yoke removed from the apertures 91 and 94. In the first position the guard means 55*c* is in overlapping relation to the fastener means 45*c* to prevent access thereto, and in the second position the guard means is pivoted by hinge 95 to an open position with respect to the fastener means for removal of the portable equipment.

In accordance with another embodiment of the present invention illustrated in FIGURES 10–13, we have a display carbinet 100 for use in conjunction with portable equipment or devices 10, such as cameras, that are to be locked in place and yet viewed in an establishment by potential customers without the assistance of a salesman and fear of possible theft thereof.

The display cabinet 100 consisting of substantially a rectangular frame means 101 having a bottom 102 provided with bolting means 103 to secure it to the floor against theft and legs 104 on the bottom 102 thereof to raise the frame a sufficient distance from the floor to allow room for the bolting means. The frame 101 further consists of a front wall 105, a pair of side walls 106 and a rear wall 107 to form a chamber. The rear wall extends partially above the support means 108 and has a front surface 109 which forms part of the guard means 110 in the form of a backstop. Support means 108 which forms the top of the cabinet 100 acts as a camera platform and has a mat 111 made from felt or other material thereon to prevent the cameras from being scratched as they are secured in place. The mat 111 rests on the support member 112 which is secured to the frame 101.

Figure 11:
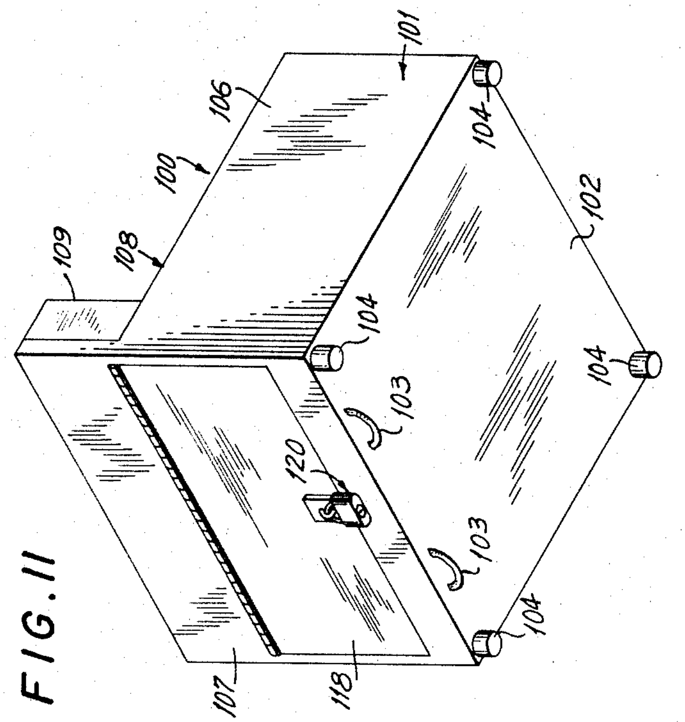
FIGURE 11 is a perspective view showing the rear of the cabinet illustrated in FIGURE 8.
Figure 13:
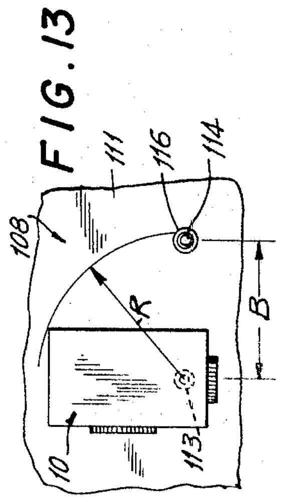
FIGURE 13 is a view along line 13—13 of FIGURE 12.
Figure 10:
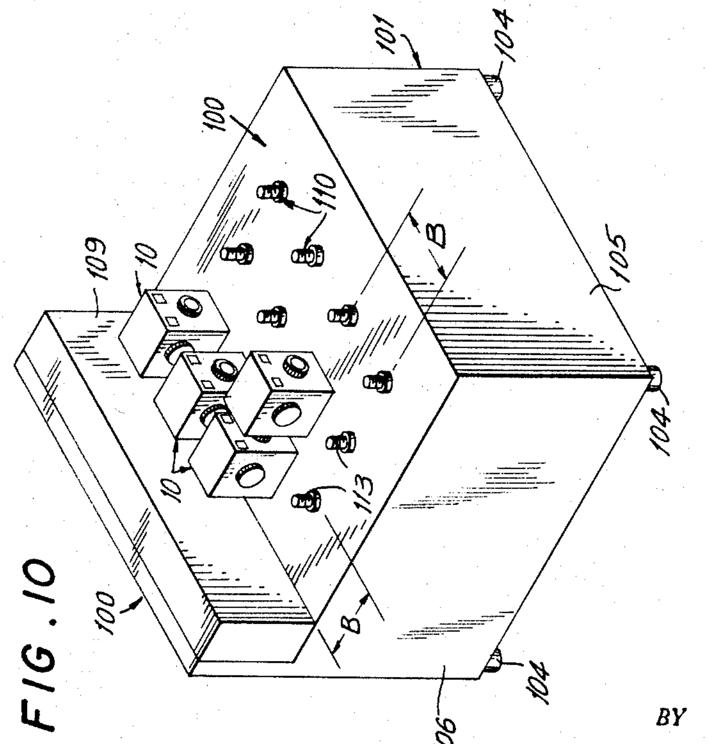
FIGURE 10 is a perspective view of a display cabinet constructed in accordance with another embodiment of the present invention.
Figure 12:
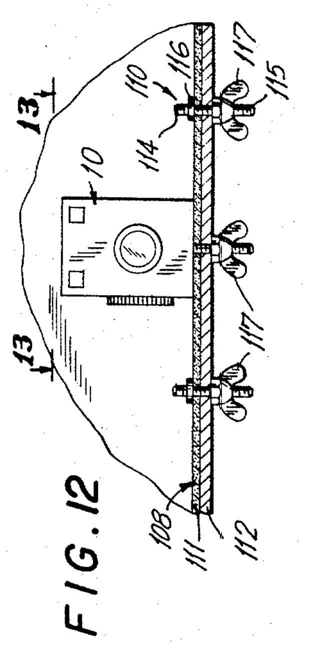
FIGURE 12 is a partial sectional view showing the locking arrangement for the displayed portable equipment.

As seen in FIGURES 11 and 12 the guard means 110 is comprised of a plurality of spaced apart stop pins 113 threaded at opposite ends 114 and 115 respectively with an enlarged collar 116 therebetween. In practice a stop pin 113 is first engaged into the fastener receiving means of the camera 10 (not shown) and then the lower threaded portion 115 is inserted through the aperture (not shown) in the support means 108 and the fastener 117, which may be in the form of a thumb screw, is tightened thereon and the camera is securely held in place. The distance between the fastener pins 113 and/or the backstop 109 is equal to a distance B and as seen in FIGURE 13 this distance is less than the distance from the location of the pin 113 in the camera 10 to its furthest point which is equal to distance R. Since the spacing is selected that the distance B is less than R the guard means is properly spaced and the camera will not be removable until the thumb screw is removed and this is only possible if the rear door of the cabinet 118 is opened.

The guard means 110 is provided to permit a number of cameras 10 to be individually displayed on the support means 108 without the necessity of having a salesman continuously watch each customer. It is important that the customer be given an opportunity to physically examine the camera. In a glass showcase this is impractical and requires the attention of a salesman due to theft. If a customer after examining all of the cameras on the support means, desires to further examine the camera then the salesman can open the back of the display cabinet 100 which as seen in FIGURE 11 is provided with the hinged door 118 which secured in a conventional way, as by locking means 120, in the form of a lock, that is normally locked to prevent access to the cabinet. The salesman having a key opens the door and releases the thumb screw 117, thus releasing the fastener pin 113 and permitting the camera to be examined by the potential customer. The camera may be returned by essentially following the same procedure in reverse.

In this manner it is possible to visually display a number of cameras in reach of the public and at the same time to be assured that they may not be readily removed.

The typewriter 10 here shown is one of any number of types of portable equipment that may be employed, and accordingly it is to be understood that in showing and describing this particular type or style, there is no intention to limit the invention in any respect as it will be readily obvious that the only requirement is that fastener receiving means be provided.

It will be seen from the foregoing description and illustrations that there is provided by the present invention a locking device which is of relatively simple construction and may be economically produced and inexpensively marketed and which will very effectively protect and prevent theft of portable equipment. The protective device can be easily and quickly placed in position for use and removed without in any way altering the form or construction of the portable equipment support.

It is to be understood that the above disclosure and drawings are directed to preferred embodiments of the invention.

I claim:

1. A locking device for securing in place portable equipment provided with fastener receiving means, to support means comprising:

(a) housing means having a chamber contained therein, and including a base portion and a cover portion in opposing spaced relation to each other to define opposite side walls of said chamber, said cover portion having an opening therein to permit access to said chamber, (b) fastener means extending through said base portion for securing said housing means, support means, and portable equipment together, said fastener means extending partially within said housing chamber and accessable through said opening in said cover portion, (c) guard means mounted for relative movement from a first position in overlapping relationship to said fastener means contained within said housing chamber and said opening to prevent removal of said fastener means through said cover portion, to a second position permitting access to said fastener means, and removal through said opening in said cover portion, and (d) locking means engageable with said guard means to prevent the latter's removal from its first to second position without the use of a key.

2. A locking device as in claim 1, wherein said guard means extends within said chamber between the base and cover portions thereof and is reciprocally mounted for relative movement between said first and second positions respectively.

3. A locking device as in claim 2, wherein:

(a) said housing is provided with a base having a pair of spaced apart legs extending therefrom and a pair of openings in each of said legs respectively, each of said pair of openings being in transversly aligned relationship with respect to each other, and the axes of said pairs of openings substantially overlapping the portion of said fastener means extending through said base and contained within the housing chamber, (b) said guard means is formed as a yoke having a pair of parallel spaced apart arms free at one end with a cross connection joining said arms together at the opposite end thereof, the spacing between said arms being substantially equal to that of said pair of openings in said legs for reciprocal movement therethrough, and the length of said arms being substantially greater than the distance between said legs for a sufficient extension of the free ends to engage the locking means exteriorally of said housing means, whereby when said yoke is inserted through said openings the fastener means cannot be removed due to the overlapping relationship between said fastener means and said arms, and (c) said locking means comprising a lock having spaced apart openings adapted to receive the free ends of said arms and to remain secured thereto except when removed by the use of a key.

4. A locking device as in claim 3, further including vibration dampening means mounted exteriorly of said housing means for maintaining engagement with said slide means with a force of predetermined magnitude to maintain them relatively fixed with respect to each other.

5. A locking device for securing in place portable equipment, provided with fastener receiving means, to support means comprising:

(a) housing means having a chamber contained therein, (b) fastener means for securing said housing means, support means, and portable equipment together, said fastener means extending partially within said housing chamber, (c) guard means mounted for relative movement from a first position in overlapping relationship to said fastener means contained within said housing chamber to prevent removal of said fastener means, to a second position permitting access to said fastener means, said guard means being reciprocally mounted for relative movement between said first and second positions respectively, (d) locking means engageable with said guard means to prevent the latter's removal from its first to second position without the use of a key, and (e) stop means associated with said housing means for preventing the angular rotation between the portable equipment and the support means, said stop means extending exteriorly of said housing means, whereby any rotation of said portable equipment would be prevented by its engagement with said stop means.

6. A locking device as in claim 5, wherein said stop means is comprised of a pin extending vertically from said housing means and above said support means and the bottom of the portable equipment, whereby any rotation of said portable equipment would be prevented by its engagement with said pin.

7. A locking device for securing in place portable equipment, provided with faster receiving means, to support means comprising:

(a) housing means having a chamber contained therein, (b) fastener means for securing said housing means, support means, and portable equipment together, said fastener means extending partially within said housing chamber, (c) guard means mounted for relative movement from a first position in overlapping relationship to said fastener means contained within said housing chamber to prevent removal of said fastener means, to a second position permitting access to said fastener means, and said guard means being reciprocally mounted for relative movement between said first and second positions respectively, said guard means is provided with a body portion adapted for reciprocal movement within said housing chamber and is formed at one end thereof with a hooked portion, and (d) locking means engageable with said guard means to prevent the latter's removal from its first to second position without the use of a key, and said locking means engaging said guard means within said housing chamber to prevent a relative movement therebetween, said locking means includes a key actuated lock secured to said housing means and having a latch arm extending within said housing chamber for engagement with said hooked portion when said guard means is in its first and locked position in overlapping relationship to said fastener means, said lock further including a key slot positioned exteriorly of said housing means to accommodate a key and disengage said latch arm from said guard means when access to said fastener means is desired.

8. A locking device as in claim 7, wherein said key slot is in a horizontal plane.

9. A locking device as in claim 7, wherein said key slot is in a vertical plane.

10. A locking device as in claim 7, further including vibration damping means secured to said housing means within said chamber and adapted to frictionally engage said guard means contained therein and prevent movement therebetween.

11. A locking device as in claim 7, further comprising a handle secured to said guard means to facilitate the movement of said slide means relative to said housing means.

12. A locking device as in claim 7, wherein said housing means includes a base secured to the underside of said support means by said fastener means and a cover in spaced relation to said base, said cover containing a slot which permits access to said fastener means when the guard means is substantially moved from the first to second position in unoverlapping relationship to said fastener means.

13. A locking device as in claim 7, wherein said fastener means is comprised of:

(a) first fastener means securing said housing means to said support means, and (b) second fastener means securing said housing means to said portable equipment, said second fastener means engaging the fastener receiving means of the portbale equipment to retain the latter in a relatively fixed position.

14. A locking device as in claim 13, wherein the spacing between the portion of the second fastener means contained within said housing chamber and the guard means is less than the depth of engagement of said second fastener means within the fastener receiving means, whereby said second fastener means cannot be disengaged from said fastener receiving means without moving said guard means.

References Cited

UNITED STATES PATENTS

| | | | |
|---|---|---|---|
| 1,814,854 | 7/1931 | Ringwald | 70—57 |
| 1,957,557 | 5/1934 | Schwahn | 70—232 |
| 2,323,058 | 6/1943 | Lambert-Carez | 70—232 |
| 2,345,949 | 4/1944 | Robbins | 70—232 |

MARVIN A. CHAMPION, *Primary Examiner.*

R. L. WOLFE, *Assistant Examiner.*

U.S. Cl. X.R.

70—14, 232